Aug. 23, 1955 W. S. MARTIN 2,715,964
GRANULAR BED FILTER
Filed June 23, 1951 2 Sheets-Sheet 1

INVENTOR
WARREN S. MARTIN
BY
ATTORNEY

Aug. 23, 1955 W. S. MARTIN 2,715,964
GRANULAR BED FILTER
Filed June 23, 1951 2 Sheets-Sheet 2
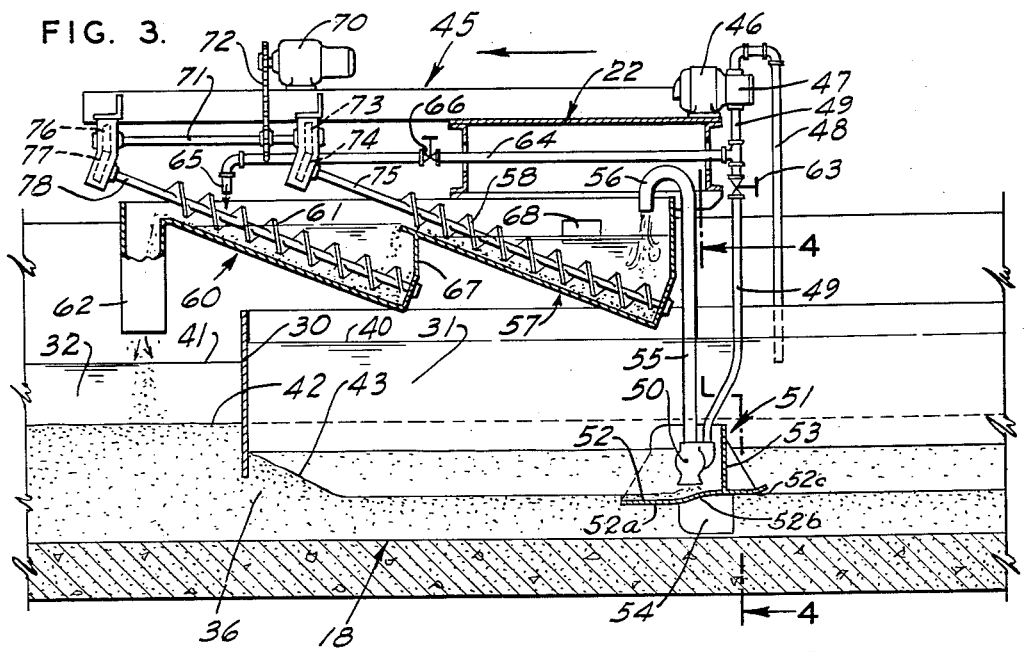
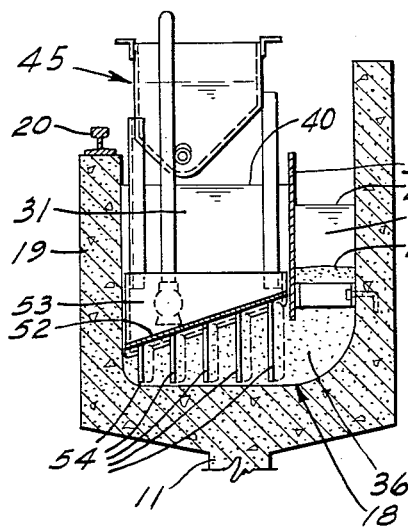
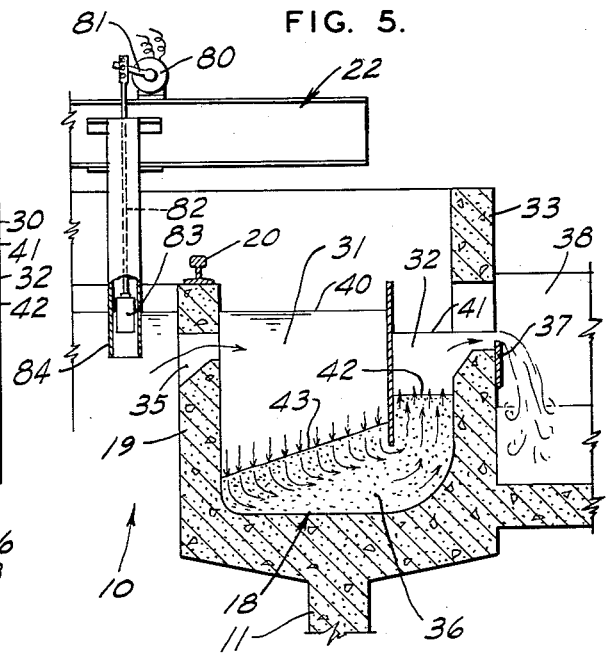
INVENTOR
WARREN S. MARTIN
BY
Louis L. Ansart
his ATTORNEY United States Patent Office 2,715,964
Patented Aug. 23, 1955

2,715,964

GRANULAR BED FILTER

Warren S. Martin, Massapequa, N. Y.

Application June 23, 1951, Serial No. 233,141

11 Claims. (Cl. 210—128)

This invention relates to granular bed filters and more particularly to filters adapted for continuously removing detritus and the like from solids bearing liquids such as municipal sewage, industrial wastes, water of water supply systems and the like.

Most methods and arrangements of apparatus heretofore proposed for the filtration of liquids such as municipal sewage are in practice subject to various difficulties and disadvantages.

In various granular filters heretofore in use the bed of granular material rests on a metal screen separating an influent chamber from an effluent chamber. Flow of liquid through the filter bed is effected by the differential head between the influent and effluent chambers. The sand serves as an excellent medium to entrap minute solids in the process of filtering and to release the entrapped solids upon suitable agitation or washing. The agitation of the sand is usually effected by an over-head filter bed chamber which also removes the dirty water containing the released solids. However, the washing operation is not so effective for cleaning the metal screen on which, particularly at the lower part thereof, accumulates a bacterial jelly-like growth which tends to block the liquid flow.

Due to the character of the granular bed filters it is highly desirable to have quiescent flows through the beds thereof. In the apparatus heretofore in use there is considerable settling of the solids carried through the filter bed. The resulting accumulation of settling solids in different parts of the system may become offensive and septic.

An important object of the invention is to provide a novel and advantageous filter having a filter bed adapted to handle liquids involving a wide variation of quantity and quality of detritus, and means for automatically removing said detritus in concentrated form.

Another object of the invention is to provide a filter comprising a filter bed of granular material without the conventional screen support and without the aid of ducts auxiliary to the filter bed chambers or channels.

A further object of the invention is to provide a filter wherein a filter bed of granular material is advanced from an effluent channel to an influent channel while the liquid to be filtered is passing therethrough from the influent channel to the effluent channel, and during this operation the contaminated influent surface of the filter bed is removed and clean sand introduced into the effluent channel of the filter.

According to one embodiment of the invention use is made of a settling tank from which settled sewage sludge is removed at the bottom and the supernatant liquid overflows into an influent channel of a circular filter. The influent channel of the filter is separated from an effluent channel thereof by a partition of which the lower edge is spaced above the bottoms of said channels. The filter also includes a bed of granular material extending from the bottom of the influent channel to that of the effluent channel and at both sides of the partition, extending above the lower edge thereof. The liquid passes down through the part of filter bed in the influent channel and upwardly through the part of the bed which is in the effluent channel.

The apparatus also includes means for cleaning the filter bed by removing contaminated sand from the surface of the bed in the influent channel, washing it and returning the washed sand to the effluent channel. Simultaneous with the said sand cleaning operation, the sand remaining in the influent filter bed is mechanically shifted to restore the filter surface in the influent channel and causes the sand in the effluent channel to flow downward by an equivalent displaced amount. The result is that the sand in the effluent channel flows gradually toward the influent channel countercurrent to the flow of water through the filter bed. With this form of filter bed and cleaning apparatus there are no places at which material can be entrapped and become septic. It will be evident that the sand in flowing downwardly in the effluent channel and upwardly in the influent channel will have a scouring effect on the surfaces in contact therewith.

According to the present invention the path of flow through a filter bed can be made as long as desired thus assuring thorough cleaning, whereas in granular bed filters, equipped with overhead cleaners, the beds have necessarily been shallow. Also the apparatus of the present invention makes it possible to have different surface areas of the bed in the influent and effluent channels and therefor to have different velocities of flow through such different surfaces.

In earlier filters of this character, the granular material apparently produced a flocking action in that flocks not appearing in the influent sewage were found in the effluent. To remove these flocks there would have to be an additional filtration. With the deep bed effect of the bed of the present invention such flocks would be removed.

Other objects, features and advantages will appear upon consideration of the following detailed description and of the drawings in which:

Fig. 3 is a sectional view on a larger scale taken on line 3—3 of Fig. 1;

Fig. 4 is a sectional view taken on the line 4—4 of Fig. 3; and

Fig. 5 is a fragmentary view on a larger scale showing a part of the apparatus illustrated in Fig. 2.

Figure 2:
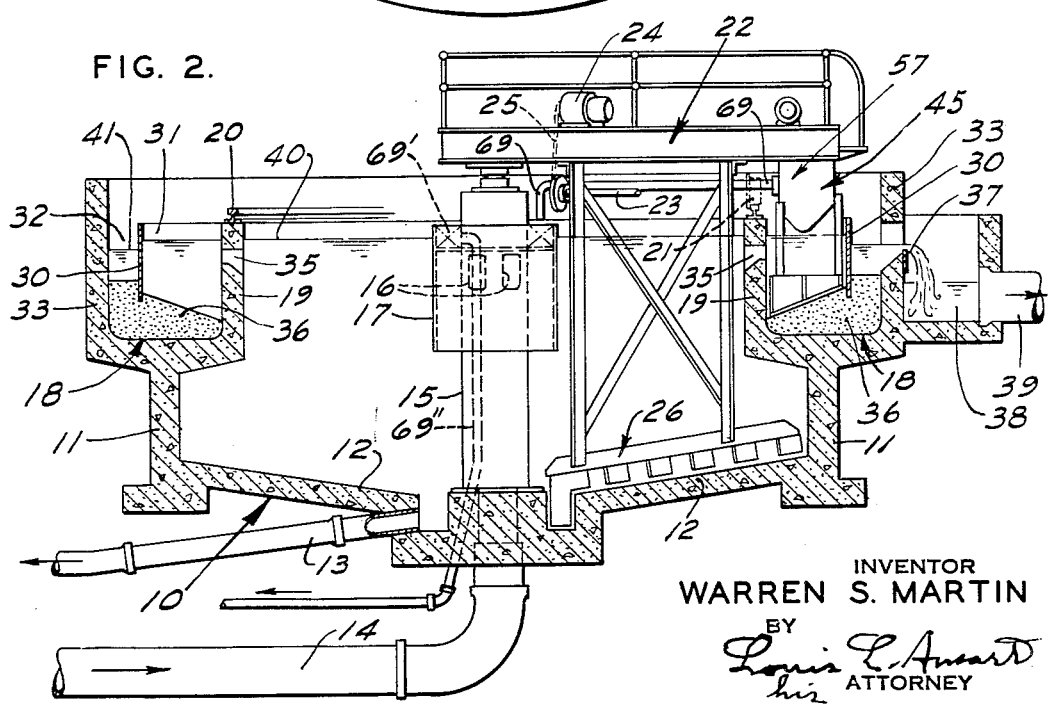
Fig. 2 is a vertical section on the line 2—2 of Fig. 1.

As illustrated in the drawings the apparatus includes a settling tank 10 having a cylindrical wall 11 and an inclined bottom 12 sloping from the side wall 11 to its center where the settled solids are discharged through a duct 13 (Fig. 2).

The sewage or other liquid to be purified is supplied through a duct or pipe 14 extending upwardly to a hollow central column 15 having near its top lateral openings 16 through which the liquid passes to the interior of a surrounding shell 17 and flows downwardly therethrough into the interior of the tank 10. The heavier solids in the liquid settle on the bottom 12 whereas the supernatant liquid flows out of the tank near its top as will be described hereinafter. Mounted on the top of the wall 11 of the tank is a main filter channel 18 of which an inner wall 19 is utilized to carry a rail 20 on which run one or more wheels 21 which support the outer end of a bridge 22 which is pivotally mounted on the top of the column 15. One of said wheels 21 is fixed on a shaft 23 carried by the bridge 22 and driven by a motor 24 carried by the bridge and connected to shaft 23 by a sprocket chain 25 running over sprocket wheels on the motor shaft and on the shaft 23. Carried by the bridge is a device 26 (Fig. 2) of a well known type which moves the sludge on the bottom 12 of the tank to the center where it will pass out through the duct 13.

In the filter channel there is a cylindrical partition or wall 30 which divides the filter channel into an influent channel 31 and an effluent channel 32 and terminates above the bottom of filter chamber 18 thereby maintaining communication between the channels 31 and 32. Preferably the top of outer wall 33 of the filter channel 18 is higher than the tops of walls 19 and 30.

As illustrated the supernatant liquid passes into the influent channel 31 of the filter through openings 35 in the inner wall 19 of the filter channel. In the lower part of the filter channel 18 is a filter bed 36 of granular material such as sand which extends upwardly into channels 31 and 32 so as to prevent passage of liquid from influent channel 31 to effluent channel 32 without passing through said filter bed. As shown at the right of Fig. 2 when the liquid in the effluent channel 32 rises to a sufficiently high level it will flow over weir 37 into a collecting chamber 38. From said collecting chamber 38, the filtered liquid is discharged through duct or pipe 39.

In order to pass the liquid from the settling tank 10 through said filter bed 36, the liquid level 40 in the influent channel 31 must be higher than the liquid level 41 in the effluent channel 32, that is there must be a differential head.

As liquid to be filtered enters filter bed 36 at surface 43 and passes through the bed and out of the same at surface 42, solids in the liquid will be entrained at said surface 43 and to a further extent beyond the same. Obviously if nothing were done to clean the bed at this surface, the filter would gradually become clogged and the differential of the liquid heads might become too great and the solids to be removed might also penetrate to the interior of the filter bed. To avoid such undesirable condition, the present invention proposes to provide means whereby the contaminated sand at the surface in the influent channel can be removed continuously, washed and returned as clean sand to the surface 42 of the bed in the effluent channel 32, the dirty water resulting from the washing being discharged outside the settling tank. The removal of the said contaminated sand would lower the surface 43 by the amount displaced and to prevent such a condition the sand in channel 31 below the area of removal is mechanically shifted away from the space below wall 30 to restore the influent surface 43 in a manner simultaneous with the removal action. This operation will result in a flow of clean sand from the effluent channel beneath the lower edge of wall 30 to the influent channel of the filter, in an amount equivalent to that removed as contaminated sand.

For keeping the filter bed clean in the manner specified, use may be made of cleaning apparatus or cleaner 45 illustrated in detail in Figs. 3, 4 and 5. To diminish short-circuiting the liquid around the lower edge of wall 30, the filter bed 36 is maintained with an upper surface inclined downwardly from wall 30 to wall 19. The filter surface 43 is maintained at a level sufficiently higher than the lower edge of the adjacent wall 30 to avoid undermining the sand below the wall 30 by the removal of the contaminated layer of sand at surface 43. The level of sand at 42 in the effluent channel 32 is maintained to sufficiently supply clean sand in a uniform manner to the influent channel 31 when the sand bed is shifted to restore surface 43.

Figure 1:
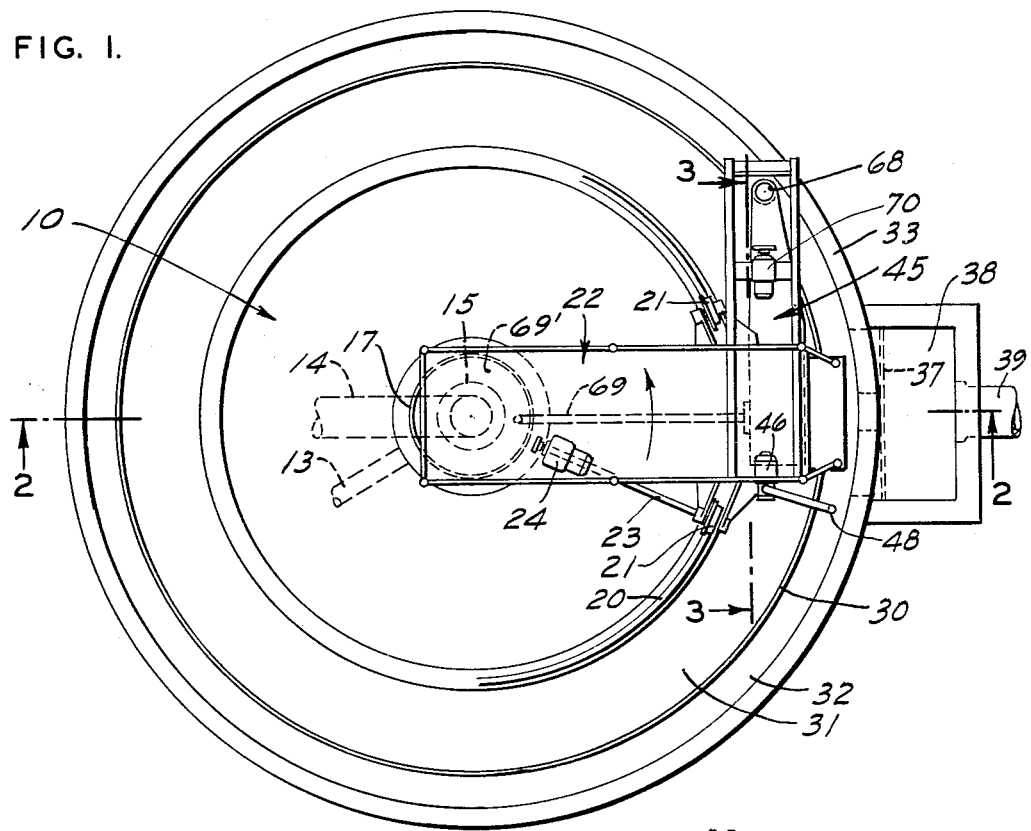
Fig. 1 is a top plan view of one embodiment of the invention.

The bridge 22 swings counterclockwise (Fig. 1) in a direction to move cleaner 45 to the left in Fig. 3. A motor 46 driving a pump 47 is mounted on bridge 22 and draws clean water from effluent filter channel 32 through a pipe 48. The pump 47 forces water downwardly through a pipe 49 to a sand pump 50 above a shoe or scraper 51 comprising an inclined plate 52 with a flat forward edge.

Said plate 52 is inclined in a position parallel with the surface 43 of the filter bed with its flat forward edge 52a extending a predetermined depth below the surface 43 to remove the concentrated portion of matter caught by the sand layer at surface 43. Plate 52 forms the bottom portion of scraper 51 and extends across the width of the filter bed in channel 31 but allowing working clearance adjacent to walls 19 and 30. The intermediate portion of plate 52 (Fig. 3) is inclined upward and rearward at 52b where it is formed to a relatively flat shoe or tail piece 52c correlative with the restored surface 43. The scraper 51 has sides extending upward from plate 52 and a plate 53 extending upward from the tail piece 52c which connects the sides to form a scoop on the forward part of scraper 51 to collect and confine the scrapings to an area where they will be drawn away by the said sand pump 50.

Projecting downwardly from the bottom of scraper 51 are plates or plows 54 inclined in a manner to shift the sand toward wall 19. Said plows 54 are located to follow the flat edge portion 52a and cooperate with the shoe or tail piece 52c to shift sidewise and raise the sand level corresponding to the layer removed by scraper 51 and restore the surface 43 to the normal position. The plow 54 adjacent to the wall 30 shifts the sand away from the area of channel 32 whereupon the sand in channel 32 flows downward and sidewise in the lower area to fill the void caused by said adjacent plow 54. The filter sand lends itself to a fluid state by the deep action of the plows 54 but after it is confined to a smooth surface by the shoe 52c, it again assumes a very stable body. Plate 52 seals off the filtering action in the vicinity of the shifting plows 54 and prevents contamination of the lower part of the bed which would otherwise occur.

From the sand pump 50, the dirty sand and water are passed upwardly through a pipe 55 and discharged through a spout 56 into the deep end of a tank 57 also carried by said bridge 22. Said tank 57 has an inclined bottom, and a screw or spiral conveyor 58 close to said inclined bottom carries the sand to the top thereof where it drops into the deep end of a second tank 60 at a higher level and also having an inclined bottom along which the sand is moved upwardly by a screw 61 or spiral conveyor 61 to the upper end of a spout 62 through which it is dropped into the channel 32.

To wash the sand thoroughly in its passage through tanks 57 and 60, water is introduced into tank 60 near said spout 62. This water can be drawn from pipe 49 above a valve 63 and passed through a horizontal line 64 to a spout 65 where it flows into the shallow end of tank 60. A valve 66 in said horizontal line 64 in connection with valve 63 enables regualtion of amount of the flow in these lines. The water flows from spout 65 into tank 60 and overflows wall 67 at the deep end of tank 60, thus passing into tank 57. The sand is thoroughly washed in this operation and the water flowing countercurrent with respect to the sand collects and holds in suspension the smaller impurities.

The dirty water thus produced flows from tank 57 through a discharge opening 68 and, through a radial pipe or duct 69 (Figs. 1 and 2), carried by the bridge 22, is discharged into an annular channel 69' around column 15. From said channel 69' the dirty water is discharged from the apparatus through a duct 69'' which passes downwardly through the column 15 and out of the apparatus.

The spiral conveyors 58 and 61 are driven in any suitable manner. As illustrated in Fig. 3, a motor 70 fixed on bridge 22 drives a shaft 71 by means of a sprocket chain 72 passing around sprocket wheels fixed on the shaft of motor 70 and shaft 71. Shaft 71 is provided at its right end (Fig. 3) with a gear 73 which drives a gear 74 fixed on shaft 75 of spiral or screw 58. Fixed on the other end of said shaft 71 is a gear 76 which meshes with a gear 77 on shaft 78 carrying spiral or screw 61.

It should be noted that inasmuch as washer 45 projects forwardly from bridge 22, the washed sand is deposited on areas of sand in the effluent filter channel 32 before contaminated sand is removed from a corresponding area in the influent filter channel 31.

The apparatus disclosed in the drawings is not only very simple in structure but is very effective in operation. The cleaning is thorough and facilitates continuous operation of the filter.

If the liquid level in the tank 10 falls too low thus causing a change in the differential head, cleaning and washing operations should cease until the proper liquid level in the tank is again reached. Control of these conditions may be effected by means of a switch 80 controlling the operation of motors 24, 46 and 70. This switch 80 is operated by means of an arm 81 thereof. Said arm 81 is connected to the upper end of a link 82 attached at its lower end to a float 83 arranged to rise and fall in a tube 84 extending from the bridge 22 into the interior of settling tank 10.

As an example of alternate forms of the present invention, the scraper and a correlative shoe 52c could be two separate devices with the plow members 54 secured to the said shoe. Such an arrangement would allow a shifting device comprising the shoe 52c and the shifting plows 54 to be withdrawn temporarily when the scraper 51 is removing an extremely thin layer of sand or only the contaminated solids just above the surface 43.

A sand washer of the type described but with a single tank in lieu of tandem tanks may function with high efficiency for some applications; other types of sand washers may be advantageous for particular application and may be used heretofore to restore or revivify various filter material without departing from the prime features and advantages of the present invention.

It should be understod that various changes can be made and that certain features may be used without others, without departing from the true scope and spirit of the invention.

What is claimed is:

1. A filtering apparatus comprising a circular filter chamber, a circular wall suspended within said chamber but spaced from the bottom thereof dividing said chamber into an influent channel and an effluent channel having concentric relationship, a bed of filter sand filling the lower parts of said chamber and the space under said wall, means for producing a differential head of liquid to cause a flow thereof through said sand filter bed from said influent channel to said effluent channel, means for progressively reconditioning said filter bed comprising a sand washer and a scraper travelling in an annular path over said chamber for continuously removing the top layer of sand and filtered material from the surface of said bed in said influent channel, said sand washer comprising means to wash the filter sand from said filtered material, depositing the washed sand in the effluent channel and discharging separately the said filtered material; and means correlative with said scraper for progressively shifting the sand of said filter bed from said effluent channel to maintain a uniform filter surface at said influent channel.

2. A filtering apparatus according to claim 1 wherein the said bed of filter sand at the said influent channel is maintained with a variable depth in the transverse plane with the deepest part adjacent to said wall.

3. A filtering apparatus according to claim 1 wherein the said sand washer is electrically power operated and is selectively operated by a float actuated switch responding with the correlative variation of the liquid level of said influent channel.

4. A filtering apparatus according to claim 1 wherein the said means for washing the removed filter sand comprises two washing tanks arranged in series, each of said tanks having deep and shallow ends and a narrow bottom inclined upwardly from said deep end, a conveyor spiral in each of said tanks to move said sand upwardly toward the shallow ends of the tanks and to discharge it from said shallow ends, a jet pump for elevating the sand and material removed by said scraper and discharging into the first tank; said sand being discharged from the first tank into the second tank and therefrom into said influent channel, means for supplying rinse liquid to flow countercurrent against the flow of sand through said washer and means for discharging separately the said filtered material and dirty fluid.

5. A filtering apparatus according to claim 1 wherein the said sand washer comprises a washing tank having deep and shallow ends and a narrow bottom inclined upward from said deep end, a conveyor spiral to move said sand upwardly toward the shallow end and to discharge it therefrom into said effluent channel, a jet pump for elevating the sand and material removed by said scraper and discharging into the deep end of said tank, means for supplying rinse liquid to flow countercurrent against the movement of sand through said washer and means for discharging separately the said filtered material and dirty fluid.

6. The combination of a filtering apparatus and a sedimentation basin comprising an annular filter chamber and a sedimentation basin having concentric relationship and having direct communication to feed the supernatant liquid from said basin to said filter, a circular wall suspended within said filter chamber but spaced from the bottom thereof dividing said chamber into an influent channel and an effluent channel having concentric relationship, means for producing a differential head of liquid to cause a flow thereof through said sand filter bed from said influent channel to said effluent channel, means for progressively reconditioning said filter bed comprising a sand washer and a scraper travelling in an annular path over said chamber for continuously removing the top layer of sand and filtered material from the surface of said bed in said influent channel, said sand washer comprising means to wash the filter sand from said filtered material, depositing the washed sand in the effluent channel and discharging separately the said filtered material; and means for progressively shifting the sand of said filter bed from said effluent channel to maintain a uniform filter surface at said influent channel.

7. The combination of a filtering apparatus and a sedimentation basin according to claim 6 wherein the means for supporting and propelling the said sand scraper includes a device for collecting the sediment in said basin.

8. A filtering apparatus comprising a circular filter chamber, a circular wall suspended within said chamber but spaced from the bottom thereof dividing said chamber into a circular influent channel and a circular effluent channel having concentric relationship, a bed of filter sand filling the lower parts of said chamber and the space under said wall, means for producing a differential head of liquid to cause a flow thereof through said sand filter bed from said influent channel to said effluent channel, means for progressively reconditioning said filter sand comprising a scraper travelling in an annular path over said sand bed in said influent channel for removing the top layer of filter sand and filtered material therefrom, means for washing the removed filter sand, depositing the washed sand in said effluent channel and discharging separately the said filtered material; and means for progressively shifting the sand of said filter bed from said effluent channel to maintain a uniform filter surface at said influent channel.

9. A filtering apparatus comprising an annular filter chamber, an annular wall suspended within said chamber but spaced from the bottom thereof dividing said chamber into an influent channel and an effluent channel having concentric relationship, a bed of granular filter material filling the lower part of said chamber and the space under said wall, means for producing a differential head of liquid to cause a flow thereof through said filter material from said influent channel to said effluent channel, means for progressively revivifying said filter material comprising a scraper travelling in annular path over said sand bed in said influent channel for removing the top layer of filter material and filtered matter therefrom, means for revivifying the removed filter material, depositing the said revived material in said influent channel and discharging separately the said filtered matter, and means correlative with said scraper for progressively shifting the said material of said filter bed from said effluent channel to maintain a uniform filter surface at said influent channel.

10. A filtering apparatus according to claim 9 wherein the said bed of filter material at said influent channel is maintained with a variable depth in the transverse plane with the deepest part adjacent to said wall.

11. A filtering apparatus according to claim 9 wherein the said travelling means for revivifying said filter material is electrically power operated and is selectively operated by a float actuated switch responding with the correlative variation of the liquid level of said influent channel.

References Cited in the file of this patent
UNITED STATES PATENTS

| | | |
|---|---|---|
| 659,916 | Davis | Oct. 16, 1900 |
| 845,744 | Blaisdell | Mar. 5, 1907 |
| 1,007,929 | Deacon et al. | Nov. 7, 1911 |
| 1,045,830 | Gates | Dec. 3, 1912 |
| 1,554,129 | Ryan | Sept. 15, 1925 |
| 1,830,515 | Kurie, Jr. et al. | Nov. 3, 1931 |
| 2,136,400 | Steindorf | Nov. 15, 1938 |
| 2,195,415 | Lose, Jr. | Apr. 2, 1940 |
| 2,224,191 | Lose, Jr. | Dec. 10, 1940 |
| 2,228,852 | Shafer, Jr. | Jan. 14, 1941 |
| 2,280,930 | Reeves | Apr. 28, 1942 |